(12) United States Patent
Williams

(10) Patent No.: US 8,358,583 B2
(45) Date of Patent: Jan. 22, 2013

(54) CONTROLLING QOS IN A WIRELESS APPARATUS

(75) Inventor: Andrew Gordon Williams, Swindon (GB)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 0 days.

(21) Appl. No.: 13/286,825

(22) Filed: Nov. 1, 2011

(65) Prior Publication Data

US 2012/0099529 A1    Apr. 26, 2012

Related U.S. Application Data

(63) Continuation of application No. 10/529,961, filed as application No. PCT/GB03/04253 on Oct. 1, 2003, now Pat. No. 8,068,421.

(30) Foreign Application Priority Data

Oct. 1, 2002 (GB) .................................. 0222632.2

(51) Int. Cl.
*G01R 31/08* (2006.01)
(52) U.S. Cl. ......................................... 370/235; 713/154
(58) Field of Classification Search .................. 713/154; 370/218, 325, 329
See application file for complete search history.

(56) References Cited

U.S. PATENT DOCUMENTS

| | | | |
|---|---|---|---|
| 6,452,915 B1 | 9/2002 | Jorgensen | |
| 6,621,793 B2 | 9/2003 | Widegren et al. | |
| 6,847,610 B1 | 1/2005 | Suumaki et al. | |
| 8,068,421 B2 | 11/2011 | Williams | |
| 2002/0036983 A1 | 3/2002 | Widegren et al. | |
| 2002/0114274 A1 | 8/2002 | Sturges et al. | |
| 2003/0193967 A1 | 10/2003 | Fenton | |
| 2003/0235184 A1 | 12/2003 | Dorenbosch et al. | |
| 2005/0235349 A1 | 10/2005 | Boyle et al. | |
| 2006/0029104 A1 | 2/2006 | Jungck | |

FOREIGN PATENT DOCUMENTS

| | | |
|---|---|---|
| GB | 2395090 | 5/2004 |
| WO | WO0117291 | 3/2001 |
| WO | WO0230056 | 4/2002 |
| WO | WO02104046 | 12/2002 |

OTHER PUBLICATIONS

"Digital Cellular Telecommunications System (Phase 2+); Universal Mobile Telecommunications System (UMTS); End to End Quality of Service (QoS) Concept and Architecture (3GPP TS 23.207 Version 5.5.0 Release 5)," (Sep. 2002). ETSI 123 207 v5.5.0:1-48.

3GPP (Dec. 2001). "3rd Generation Partnership Project; Technical Specification Group Core Network; Mobile Radio Interface Layer 3 Specification; Core Network Protocols—Stage 3 (Release 1999)," 3GPP TS 24.008 V3.10.0, pp. 1-447.

3GPP (Dec. 2001). "3rd Generation Partnership Project; Technical Specification Group Terminals; AT Command Set for User Equipment (UE) (Release 1999)," 3GPP TS 27.007 V3.10.0, pp. 1-159.

3GPP (Mar. 2001). "3rd Generation Partnership Project; Technical Specification Group Terminals; Mobile Station Application ExecutionEnvironment (MExE); Functional Description; Stage 2 (Release 1999)," 3GPP TS 23.057 V3.4.0, pp. 1-60.

3GPP (Sep. 2002). "3rd Generation Partnership Project; Technical Specification Group Services and System Aspects; End-to-End Quality of Service (QoS) Concept and Architecture; (Release 5)," 3GPP TS 23.207 V5.5.0, pp. 1-48.

(Continued)

*Primary Examiner* — Marcos Batista
(74) *Attorney, Agent, or Firm* — Volpe and Koenig, P.C.

(57) ABSTRACT

Controlling packet sessions and QoS in a wireless network is disclosed. An apparatus provides application-specific packet sessions in the wireless network, with application-specific QoS parameters, without requiring the explicit cooperation of an application.

15 Claims, 10 Drawing Sheets

OTHER PUBLICATIONS

3GPP (Sep. 2002). "3rd Generation Partnership Project; Technical Specification Group Services and System Aspects; Quality of Service (QoS) Concept and Architecture," 3GPP TS 23.107 V3.9.0, pp. 1-39.

European Office Action mailed Jul. 20, 2005, for European Application No. 03756551.2 filed Jan. 10, 2003, 4 pages.

Great Britain Search Report mailed Mar. 25, 2003, for Great Britain Application No. 0222632.2 filed Jan. 10, 2002, 2 pages.

International Search Report mailed Jul. 16, 2004, for PCT Application No. PCT/GB03/04253 filed Jan. 10, 2003, 3 pages.

Rosenberg, J. et al. (Jun. 2002). "SIP: Session Initiation Protocol," 3GPP Request for Comments: 3261, pp. 1-269.

Stevens, W.R. (1994). "TCP Connection Establishment and Termination" Chapter 18 in TCP/IP Illustrated: The Protocols Addison Wesley Publishing Company, vol. 1, pp. 229-262.

Non-Final Rejection, U.S. Appl. No. 10/529,961 (issued as U.S. 8,068,421), mailed Jul. 9, 2008.

Final Rejection, U.S. Appl. No. 10/529,961 (issued as U.S. 8,068,421), mailed Jun. 9, 2009.

Non-Final Rejection, U.S. Appl. No. 10/529,961 (issued as U.S. 8,068,421), mailed Apr. 23, 2010.

Non-Final Rejection, U.S. Appl. No. 10/529,961 (issued as U.S. 8,068,421), mailed Nov. 9, 2010.

Notice of Allowance, U.S. Appl. No. 10/529,961 (issued as U.S. 8,068,421), mailed Jul. 29, 2011.

CONTROLLING QOS IN A WIRELESS APPARATUS

RELATED APPLICATION(S)

This application is a continuation of and claims the benefit of U.S. patent application Ser. No. 10/529,961, filed on Nov. 3, 2005, which application claims the benefit of and is a 371 filing of PCT Patent Application No. PCT/GB03/04253, Filed Oct. 1, 2003, which application claims the benefit of United Kingdom Application No. GB 0222632.2 filed Oct. 1, 2002. The content of these documents is fully incorporated herein in their entirety.

FIELD OF THE INVENTION

This invention relates to session control in communication networks, and particularly (though not exclusively) wireless networks such as UMTS 3G (Universal Mobile Telecommunication System $3^{rd}$ Generation) mobile wireless networks.

BACKGROUND OF THE INVENTION

In the field of this invention it is known that the UMTS specifications:
[1] 3GPP TS 23.107—3rd Generation Partnership Project; Technical Specification Group Services and System Aspects; QoS Concept and Architecture (Release 1999)"
[2] 3GPP TS 27.007—3rd Generation Partnership Project; Technical Specification Group Terminals; [0005] AT command set for User Equipment (UE) (Release 1999)"
[3] 3GPP TS 23.057—3rd Generation Partnership Project; Technical Specification Group Terminals; Mobile Station Application Execution Environment (MExE); Functional description; Stage 2 (Release 1999) and
[4] 3GPP TS 24.008—3rd Generation Partnership Project; Technical Specification Group Core Network; Mobile radio interface layer 3 specification; Core Network Protocols—Stage 3 (Release 1999)
work on the principle that data packets for different data flows relating to specific services, are carried over separate packet sessions over the air. For example, streaming audio packets could be carried over one packet session, web browsing over another, email download over another, etc. The logic for this is that different QoS parameters (bandwidth, latency etc.) can be applied to the different services being used.

The UMTS standards [1] define 4 'classes' of packet flows, based on 4 categories of applications:
Conversational class (e.g., interactive voice/video)
Streaming class (e.g., streaming media such as Internet radio, or streaming video)
Interactive class (e.g., web browsing)
Background class (e.g., email download).
The corollary of this is that the wireless network needs to know when particular services are being used, so that it can correctly route data packets for each session over the relevant packet session over the air.

The UMTS standards imply a tight coupling between the applications and the mobile device, whereby the applications inform the mobile device (UE) that they are starting up, and what are the QoS characteristics of the traffic they will be sending/receiving. This will either be a direct, software interface in the case of integrated mobile devices as in standards [3] or can be an AT command interface as in standards [2].

However, the problem with the approach in the current set of UMTS specifications is that they require special versions of application software (email clients, web browsers, video streaming clients, etc.) to implement an (internal or external) interface to the UE. A standard PC (Personal Computer), when connected to a UE, with standard applications, will not support such an interface and therefore cannot support packet flows of different QoS for different applications, as demanded by the standards.

A need therefore exists for arrangement and method for session control in wireless communication network wherein the abovementioned disadvantage(s) may be alleviated.

Stateful inspection is an existing, well-known technology, used in Internet firewalls—a firewall blocks packets coming into or out of a network, except those explicitly allowed. Stateful inspection is a process whereby the firewall inspects packets flowing into it, implies the state of an application-specific packet session via the control packets, then allows data packets for that session to flow through the firewall, if the policy for flows of that type allow it.

The basic example of stateful inspection is the allowing through of TCP (Transmission Control Protocol) sessions originated from inside the firewall to an IP (Internet Protocol) address on the outside to be allowed, but TCP sessions from outside to be blocked—this is the mechanism that allows through web browsing and FTP (File Transfer Protocol) requests from the inside of a firewall, but blocks requests from the outside to web servers inside the firewall.

This is done by catching TCP connection request packets (packets originating from inside the firewall with the 'SYN' flag set), starting the TCP '3-way handshake' (as explained, for example, in Chapter 18 of "TCP/IP Illustrated, Volume 1, The Protocols" authored by W. Richard Stevens and published by Addison Wesley), then opening up the source and destination IP addresses and TCP port numbers, forwarding on the packet to the outside and then monitoring the subsequent TCP control packets to ensure the connection came up and also to catch the eventual tear-down of the TCP session.

Another example of stateful inspection in firewalls for a UDP-based (User Datagram Protocol-based) service is to allow voice over IP (VoIP) calls through the firewall. In this example, incoming VoIP call-control messages are inspected and parsed to reveal the VoIP end-points (IP address and port number) and allow voice data packets through the firewall.

BRIEF DESCRIPTION OF THE DRAWINGS

One arrangement and method for session control in a wireless communication network incorporating the present invention will now be described, by way of example only, with reference to the accompanying drawings, in which.

DESCRIPTION OF THE PREFERRED EMBODIMENT

Figure 1:
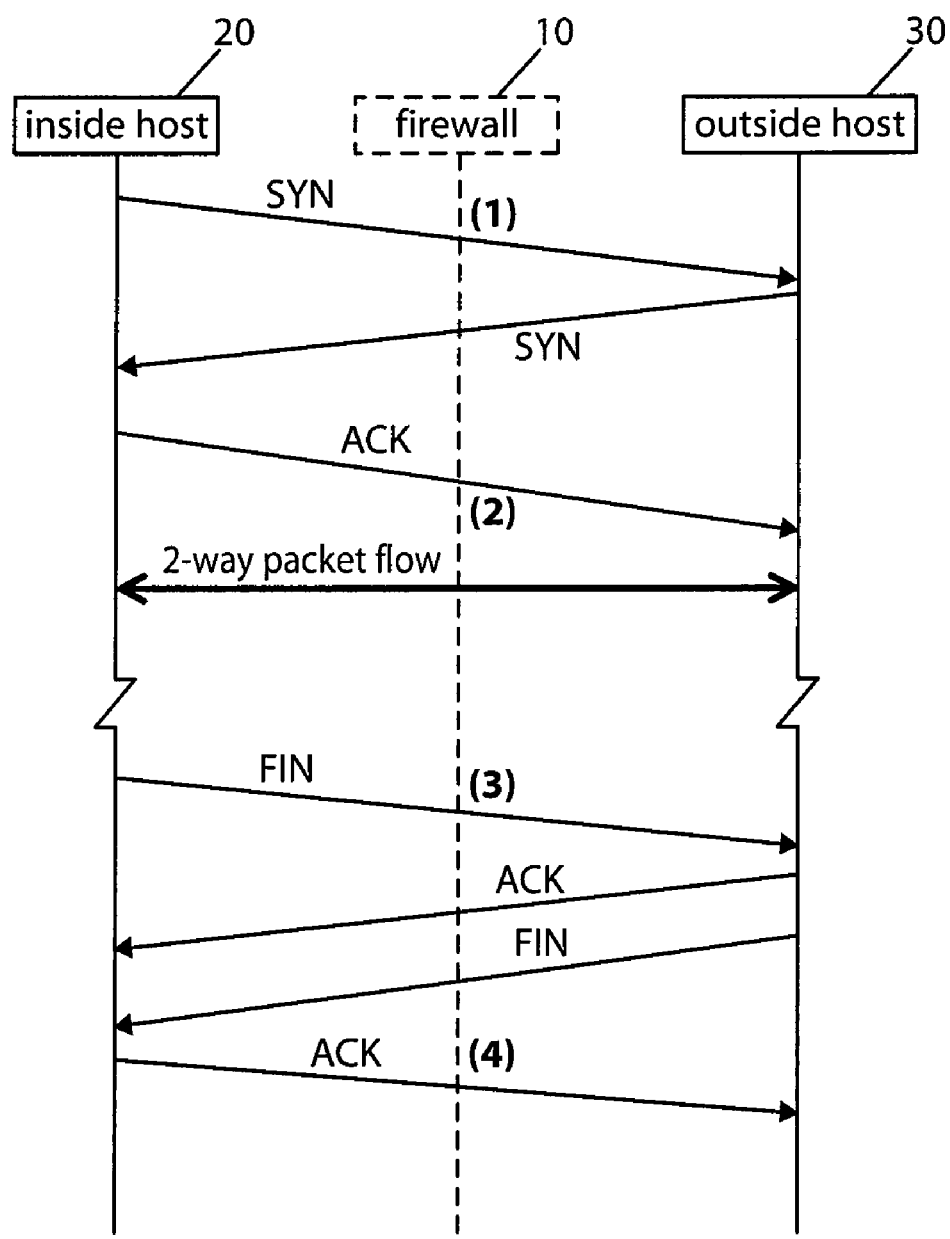
FIG. 1 shows a schematic diagram illustrating prior art data flow across an Internet network firewall between an inside host and an outside host, and showing set-up and tear-down of a session.

Generally referring firstly to FIG. 1, a known Internet network firewall 10 intermediates between an inside host 20 and an outside host 30. Operation of the firewall 10 is as follows:

At (1), session set-up begins when an outgoing TCP connection detected. The firewall 10 is opened up for remote IP address and source and destination TCP port numbers, and waits for a SYN response; a session object created by a stateful inspector (not shown).

At (2), the end of 3-way handshake detected, and 2-way TCP session packets are allowed to flow.

At (3), the start of TCP connection tear-down detected with a FIN packet from the inside host 20.

At (4), the TCP session teardown is complete, and far end IP address & session TCP port numbers are blocked by the firewall 10.

Figure 2:
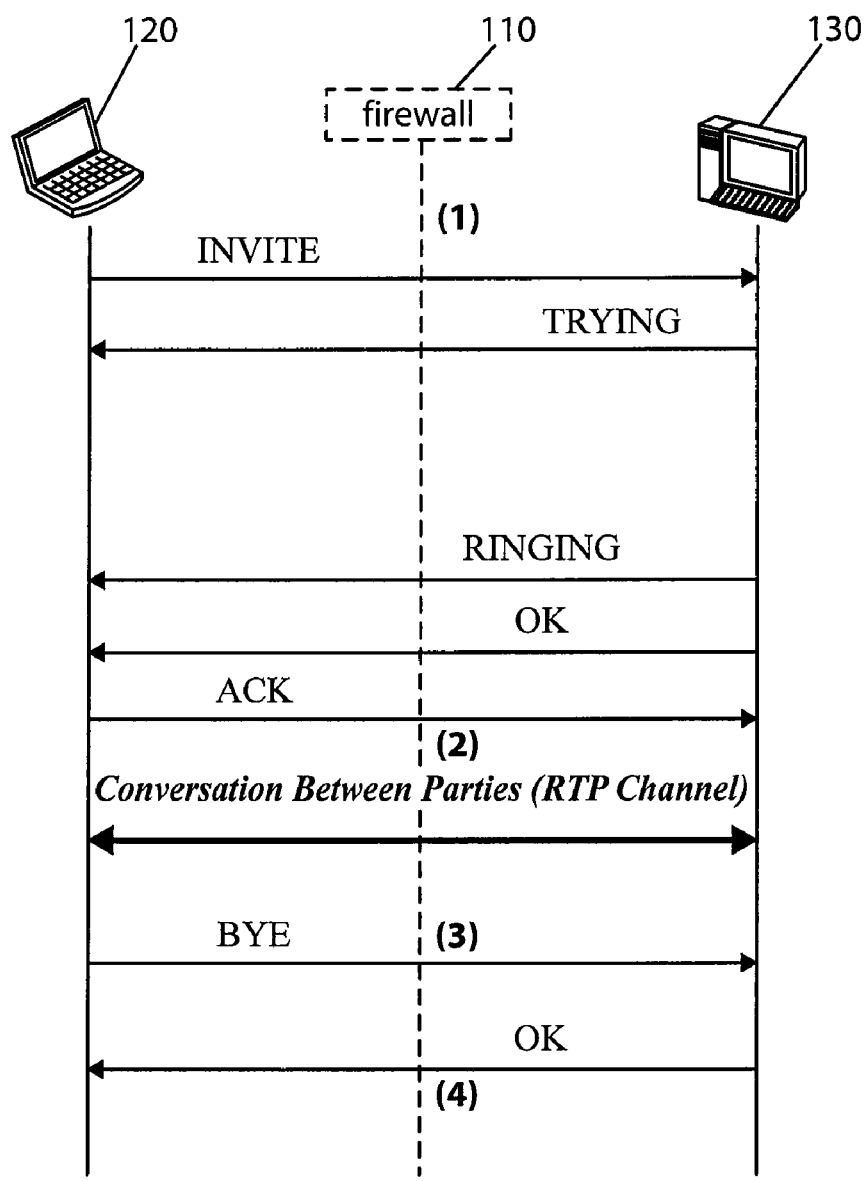
FIG. 2 shows a schematic diagram illustrating prior art VoIP data flow across an Internet network firewall between a PC and an Internet Protocol telephone set and showing set-up and tear-down.

Referring now to FIG. 2, a known Internet network firewall 110 intermediates VoIP data flow between a PC (Personal Computer) 120 and an Internet Protocol telephone set 130. Operation of the firewall 110 is as follows:

At (1), session set-up begins when an outgoing SIP session request (INVITE) is detected. The firewall 110 is opened up for remote IP address and source and destination port numbers for SIP control messages, and waits for an ACK response; a session object is created by a stateful inspector (not shown).

At (2), a successful ACK is received, and UDP source and destination port numbers are opened up for an RTP session, based on fields parsed out of INVITE and ACK messages. 2-way UDP voice session packets are allowed to flow.

At (3), start of SIP connection tear-down is detected.

At (4), SIP session teardown is complete, and far end IP address and session UDP port numbers are blocked by the firewall 110.

However, the firewalls 10 and 110 are known only in fixed-line, i.e., wired, applications.

The UMTS standards define 4 'classes' of packet flows, based on 4 categories of applications (conversational class—e.g., interactive voice/video; streaming class—e.g., streaming media such as Internet radio, or streaming video; interactive class—e.g., web browsing; and background class—e.g., email download).

The wireless network therefore needs to know when particular services are being used, so that it can correctly route data packets for each session over the relevant packet session over the air.

The UMTS standards imply a tight coupling between the applications and the mobile device, whereby the applications inform the mobile device (UE) that they are starting up, and what are the QoS characteristics of the traffic they will be sending/receiving. This will either be a direct, software interface in the case of integrated mobile devices as in standards, or can be an AT command interface as in standards.

However, the problem with the approach in the current set of UMTS specifications is that they require special versions of application software (email clients, web browsers, video streaming clients, etc.) to implement an (internal or external) interface to the UE. A standard PC (Personal Computer), when connected to a UE, with standard applications, will not support such an interface and therefore cannot support packet flows of different QoS for different applications, as demanded by the standards.

In a preferred embodiment, the present invention overcomes this drawback by applying Stateful Inspection to UMTS Session Management.

Briefly stated, in a preferred embodiment, stateful inspection is used in a UTRA (UMTS Terrestrial Radio Access) system to examine the data packets, to detect the existence of different application-specific packet flows, which then allows packet-sessions, called PDP (Packet Data Protocol) contexts in the UMTS standards, to be created over the air with the required QoS parameters.

The UE brings up a default PDP context for basic data service; all packets are then inspected, both incoming and outgoing, and application-specific traffic is used to open-up dedicated PDP contexts to carry that traffic. One example of how this is used is detection of a POP3 email download, mapping it to a 'background class' PDP context.

Figure 3:
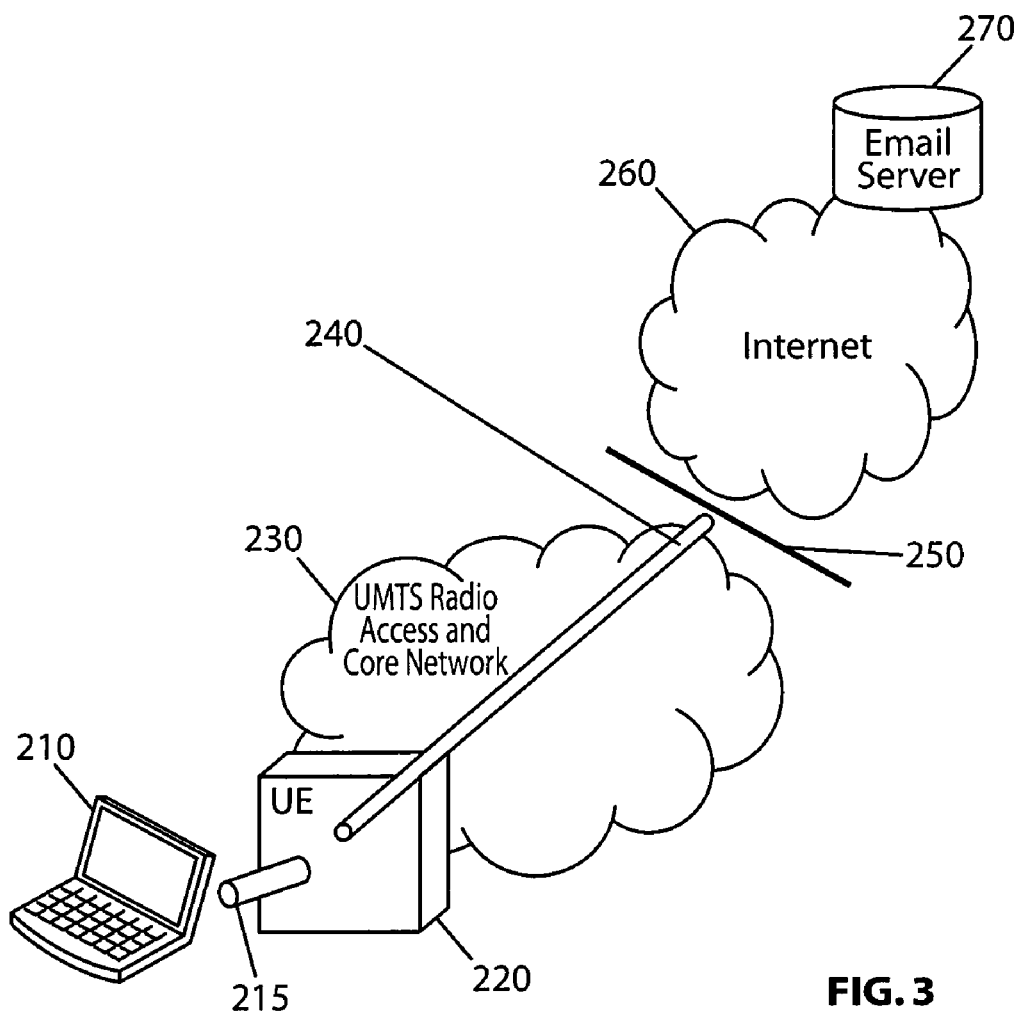
FIG. 3 shows a schematic diagram of an arrangement illustrating application of stateful inspection to UMTS session management, in the context of POP3 email download, which is mapped to a 'background class' PDP context, in accordance with the present invention.

As depicted in FIG. 3, a PC 210 (generally referred to as TE-Terminal Equipment-in UMTS terminology) is coupled, via R interface 215, to UMTS UE 220 (containing a USIM—not shown—which together with the UE forms MT—Mobile Terminal—in UMTS terminology). The UE 220 is coupled through the UMTS radio access and core network 230 via at least a default PDP context 240. The UMTS radio access and core network 230 is coupled via a Gi reference point 250) to the Internet 260, containing an email server 270.

Figure 4:
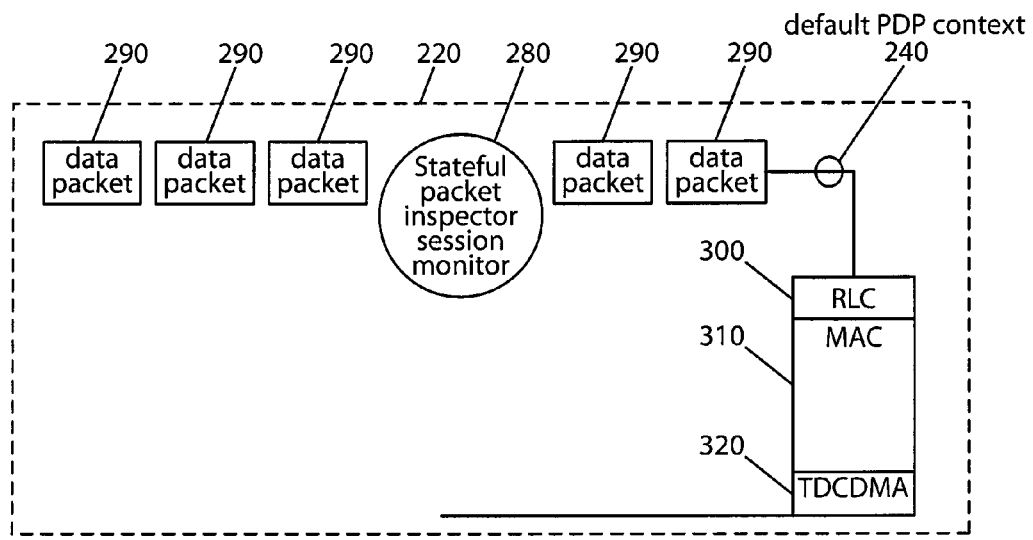
FIG. 4 shows a block schematic diagram illustrating flow of data packets in a default PDP context of the arrangement of FIG. 3.
Figure 5:
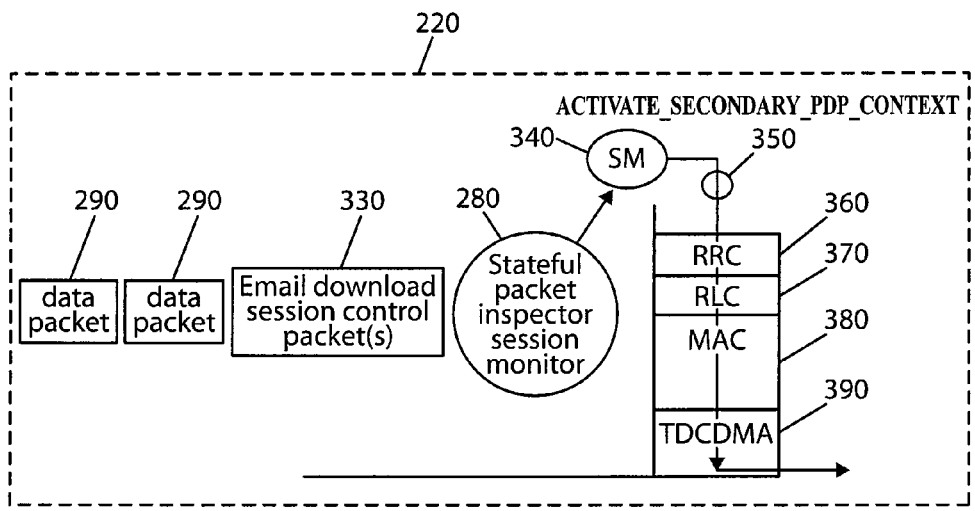
FIG. 5 shows a block schematic diagram illustrating detection of email download session control packets to activate a secondary PDP context for the email download session in the arrangement of FIG. 3.
Figure 6:
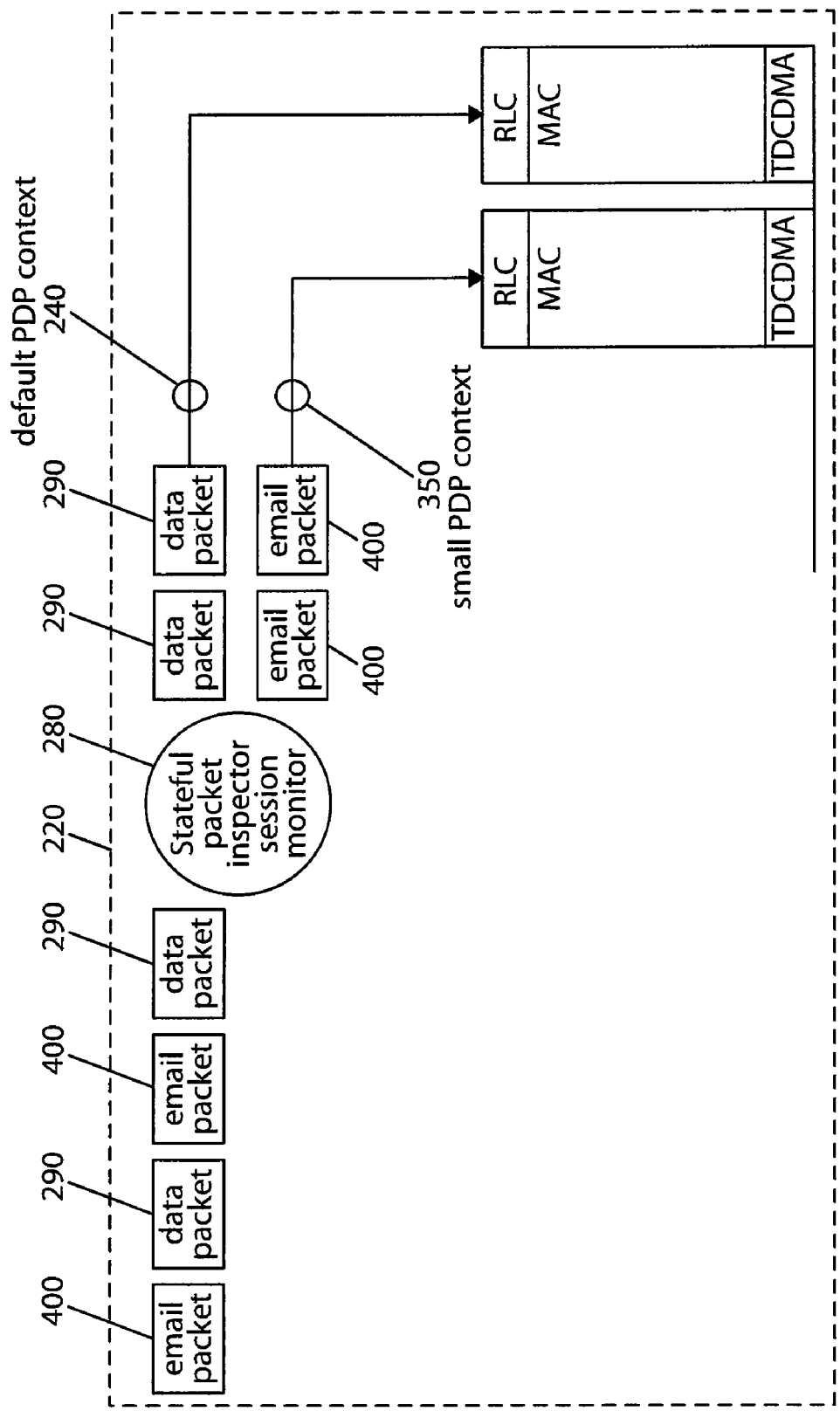
FIG. 6 shows a block schematic diagram illustrating flow of email packets and other data packets, and their respective processing as two parallel contexts, during the email download session in the arrangement of FIG. 3.

Referring now also to FIG. 4, FIG. 5 and FIG. 6, the UE 220 contains a stateful inspection session monitor 280.

As shown in FIG. 4, the stateful inspection session monitor 280 monitors packets 290 on the default PDP context 240, looking for email download control messages. In the absence of an email download control message, the UE 220 processes the data packets 290 through RLC (Radio Link Controller)

300, MAC (Medium Access Controller) 310 and CDMA (Time-Division Code-Division-Multiple-Access) physical air interface 320 in known manner.

As shown in FIG. 5, when the stateful inspection session monitor 280 detects an email download control message 330, it causes a session manager 340 to activate a secondary PDP context 350. In the activated secondary PDP context 350, the email download control packet(s) are processed through RRC (Radio Resource Controller) 360, RLC 370, MAC 380 and CDMA physical air interface 390 in known manner.

As shown in FIG. 6, after activation of the secondary PDP context 350, data packets 290 and email packets 400 are processed in parallel in separate PDP contexts as follows:
  data packets 290 are processed in default PDP context 240, and
  email packets 400 are processed in PDP context 350.

Figure 7:
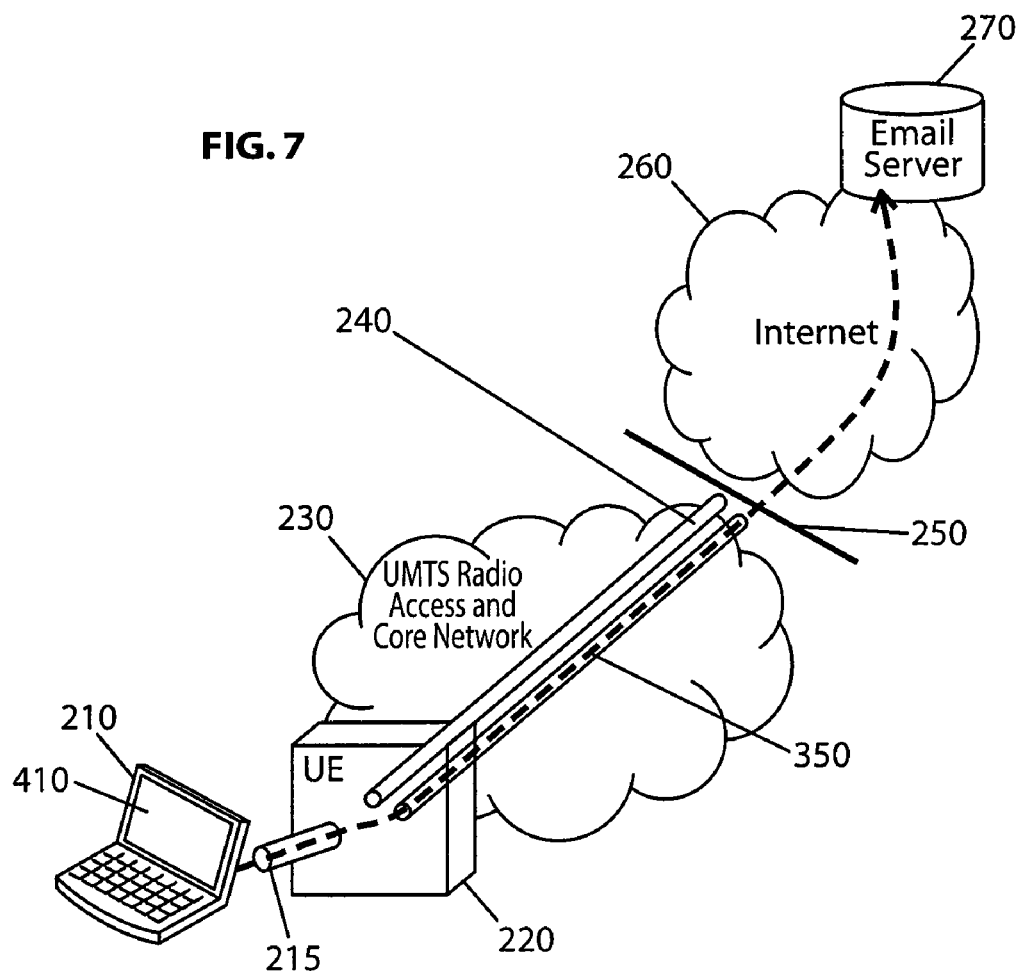
FIG. 7 shows a schematic diagram of an arrangement, similar to FIG. 3, illustrating the use of simultaneous default and secondary PDP contexts to provide separate PDP contexts for the email and data packets of FIG. 6.

Thus, as shown in FIG. 7, the email download session is conducted between the email server 270 and an email program 410 (running on the PC 210) via the PDP context 350, while the default PDP context 240 continues to process data packets as before.

Figure 8:
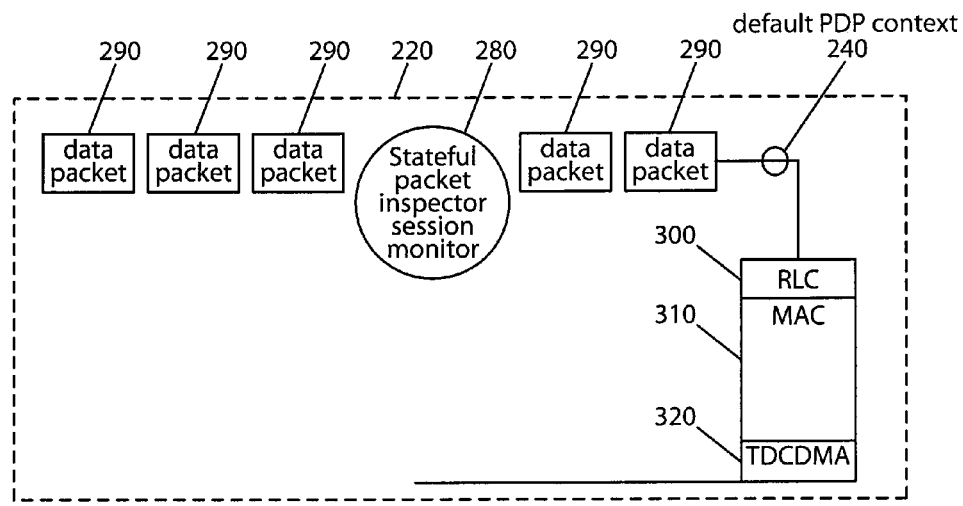
FIG. 8 shows a block schematic diagram illustrating flow of data packets in a default PDP context.
Figure 9:
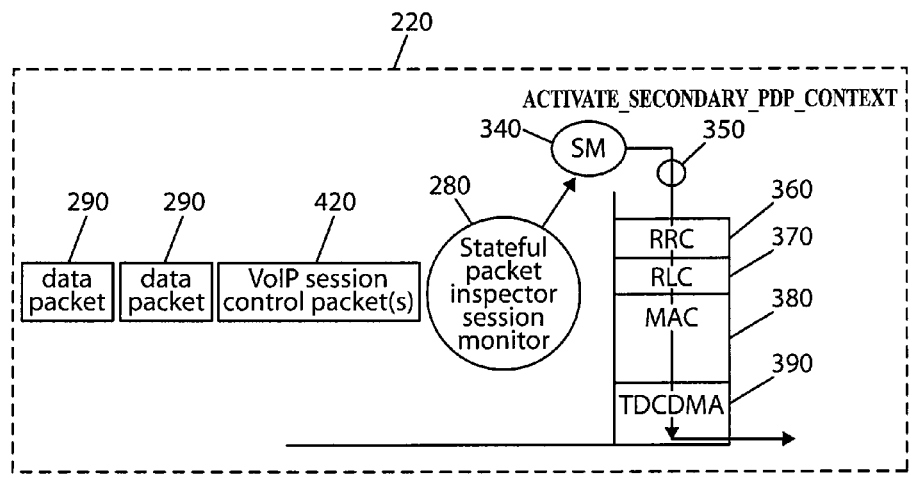
FIG. 9 shows a block schematic diagram illustrating detection of VoIP session control packets to activate a secondary PDP context for controlling a VoIP session.
Figure 10:
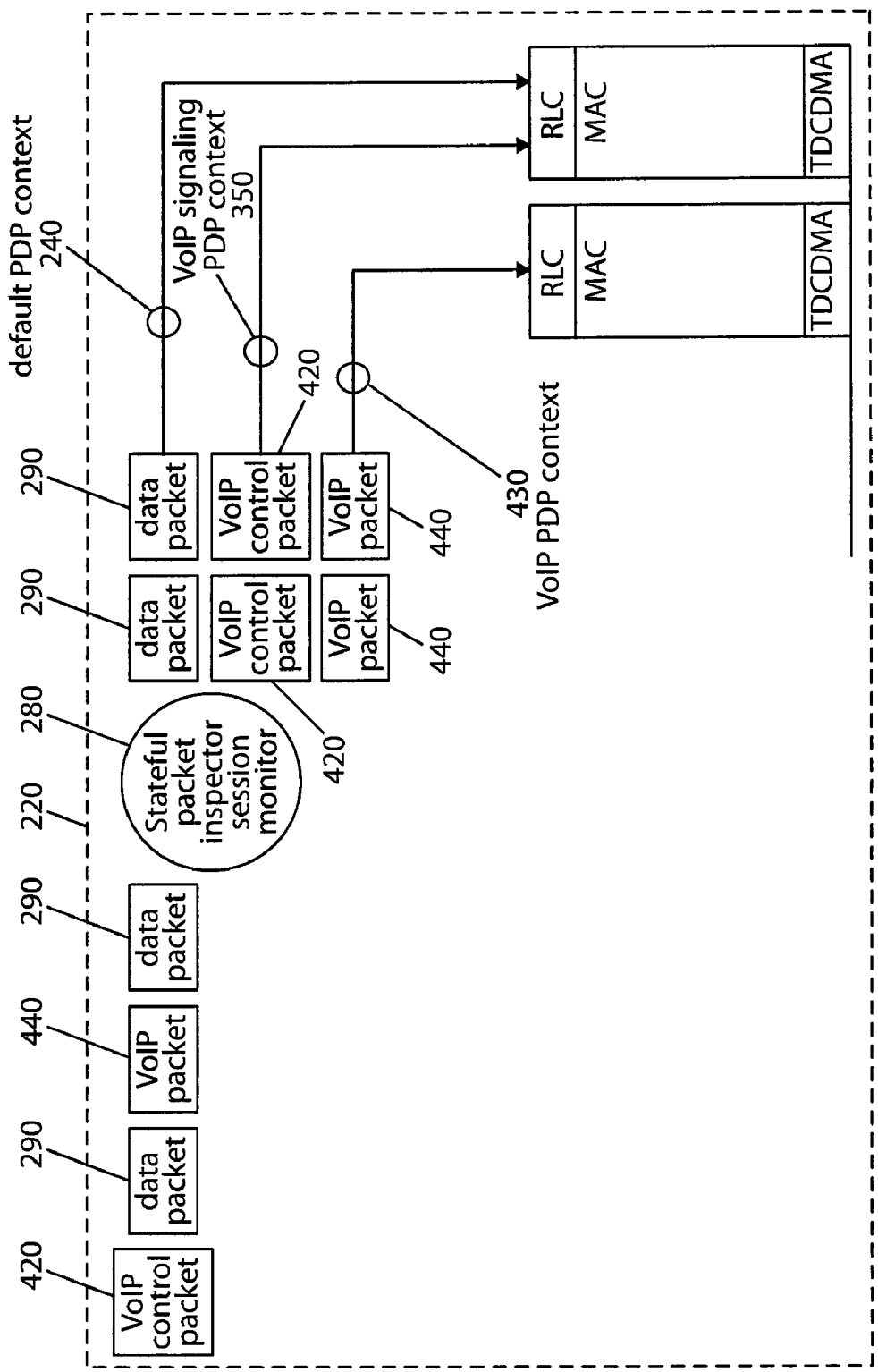
FIG. 10 shows a block schematic diagram illustrating flow of VoIP session control packets, VoIP packets and other packets, and their respective processing as two parallel contexts, during a VoIP session.

Referring now to FIG. 8, FIG. 9 and FIG. 10, another example application of the present invention, is a VoIP session initiation using SIP (as in 3GPP RFC—Request For Comments—3261 "SIP: Session Initiation Protocol", June 2002) which is mapped into a conversational class PDP context to carry the VoIP traffic and an interactive class PDP context to carry the VoIP signalling.

As shown in FIG. 8, the stateful inspection session monitor 280 monitors packets 290 on the default PDP context 240, looking for VoIP session control packet(s). In the absence of a VoIP session control packet, the UE 220 processes the data packets 290 through RLC (Radio Link Controller) 300, MAC (Medium Access Controller) 310 and CDMA (Time-Division Code-Division-Multiple-Access) physical air interface 320 in known manner.

As shown in FIG. 9, when the stateful inspection session monitor 280 detects VoIP session control packet(s) 420, it causes session manager 340 to activate a secondary PDP context 350. In the activated secondary PDP context 350, the VoIP session control packet (s) are processed through RRC (Radio Resource Controller) 360, RLC 370, MAC 380 and CDMA processor 390 in known manner. Referring now also to FIG. 10, detection of VoIP session control packet(s) also causes SM 340 to activate a further secondary PDP context 430.

As shown in FIG. 10, after activation of the secondary PDP context 350 and the further secondary PDP context 430, packets are processed in parallel in three PDP contexts as follows:
  data packets 290 are processed in default PDP context 240,
  VoIP control packets 420 are processed in PDP context 350, and
  VoIP packets are processed in PDP context 430.

Taking the specific example of the Session Initiation Protocol [RFC 3261—SIP: Session Initiation Protocol, June 2002] the QoS parameters required for a particular VoIP session can be derived or inferred from the SIP signalling.

A request to set up a session is contained in an INVITE message, e.g.

```
INVITE sip:UserB@there.com SIP/2.0
Via: SIP/2.0/UDP here.com:5060
From: BigGuy
To: LittleGuy
Call-ID: 12345601@here.com
```

-continued

```
CSeq: 1 INVITE
Contact: [0078] Content-Type: application/sdp
Content-Length: 147
v=0
o=UserA 2890844526 2890844526 IN IP4 here.com
s=Session SDP
c=IN IP4 100.101.102.103
t=0 0
m=audio 49172 RTP/AVP 4
a=rtpmap:4 G723/8000
```

In this case the 'c=' parameter identifies the IP address of the caller, the 'm=' parameter identifies this as an RTP audio stream with local UDP port number and the 'a=' parameter identifies the characteristics (bandwidth, encoding) of the audio stream.

The response message indicating answer to this might be:

```
SIP/2.0 200 OK
Via: SIP/2.0/UDP here.com:5060
From: BigGuy
To: LittleGuy ;tag=8321234356
Call-ID: 12345601@here.com
CSeq: 1 INVITE
Contact: [0095] Content-Type: application/sdp
Content-Length: 147
v=0
o=UserB 2890844527 2890844527 IN IP4 there.com
s=Session SDP
c=IN IP4 110.111.112.113
t=0 0
m=audio 3456 RTP/AVP 4
a=rtpmap:4 G723/8000
```

In this case the 'c=' parameter identifies the IP address of the called party, the 'm=' parameter identifies this as an RTP audio stream with a type 4 (6.3 kbit/s G.723.1) codec & local UDP port number of the called party and the 'a=' parameter identifies the characteristics of the audio stream—basically the codec.

Finally the ACK message sent by the caller looks like:

```
ACK sip:UserB@there.com SIP/2.0
Via: SIP/2.0/UDP here.com:5060
From: BigGuy
To: LittleGuy ;tag=8321234356
Call-ID: 12345601@here.com
CSeq: 1 ACK
```

So, by this time the source and destination IP addresses and port numbers+the bandwidth required are known—basically enough to set-up a secondary PDP context to send the packets through.

It will be understood that the application of stateful inspection of packet flows to control UMTS session management as described in the examples above presents a new and advantageous technique providing a UE interface allowing packet flows of different QoS for different applications to be supported simultaneously and in parallel, without requiring special versions of application software (email clients, web browsers, video streaming clients, etc.).

Figure 11:
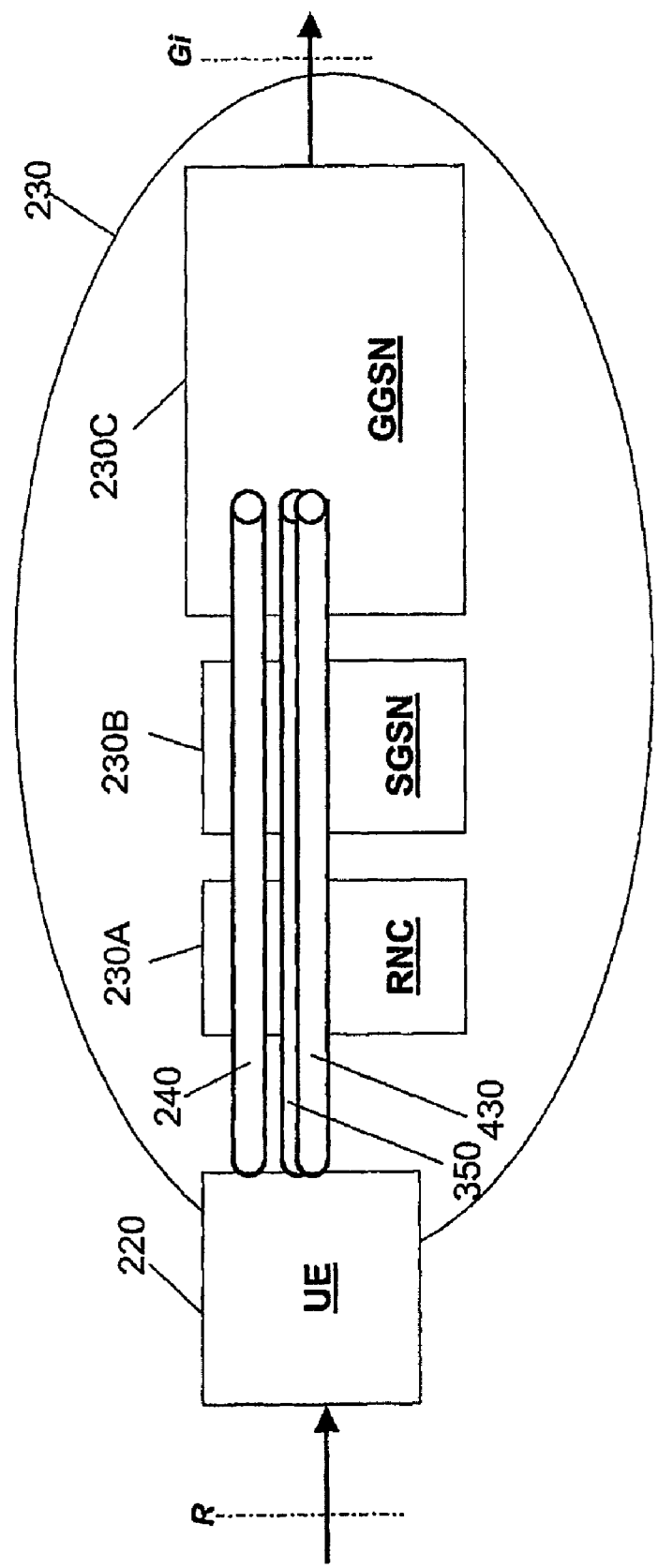
FIG. 11 shows a block schematic diagram of a UMTS network, in which packet sessions (PDP contexts) are created between UE and SGSN and forwarded on through to the GGSN, where the various packet sessions are bonded back together and connected to the target network (e.g., the Internet) in a single packet stream, in accordance with the invention.

Referring now to FIG. 11, viewed in the context of the UTRA system of FIG. 3 or FIG. 7, the VoIP example described above in relation to FIG. 8, FIG. 9 and FIG. 10 can be considered as:

(i) in the UE (220), detecting application-specific session initiation (incoming or outgoing) and setting up secondary PDP contexts to carry application packet streams (350 and 430), and (ii) in GGSN 230C, GTP (GPRS Tunneling Protocol) sessions from SGSN 230B extending the PDP contexts all the way to the GGSN. The GGSN can use the per—PDP context QoS parameters (and any other criteria it sees fit) to classify the IP traffic going into the target IP network.

Thus, in a UMTS network, packet sessions (PDP contexts) are created between the UE and the SGSN (via the Node B—not shown—and RNC 230A) and forwarded on through to the GGSN, where the various packet sessions are bonded back together and connected to the target network (e.g. the Internet) in a single packet stream.

It will be understood that although the invention has been described in the above examples with reference to email (POP3) and VoIP sessions, the invention covers additional or alternative sessions such as: 'conversational' class (e.g., Video over IP) where traffic may be based on originated calls controlled by SIP or H.323 protocol; 'streaming' class (e.g., carrying streaming media traffic controlled by Real Time Streaming Protocol); 'interactive' class; or 'background' class (e.g., carrying POP3 or SMTP traffic).

It will be understood that stateful inspector and packet filter entities exist within the UE; these may be implemented in software, firmware or hardware. The stateful inspector fits in the uplink and downlink packet flow, the packet filter fits in the uplink packet flow (in order to control the split of uplink packets into the correct PDP context). A session management software entity exists within the UE; it controls the activation and de-activation of PDP contexts. The relationship between stateful inspector, packet filter and session management is illustrated in the FIG. 12 and FIG. 13.

Figure 12:
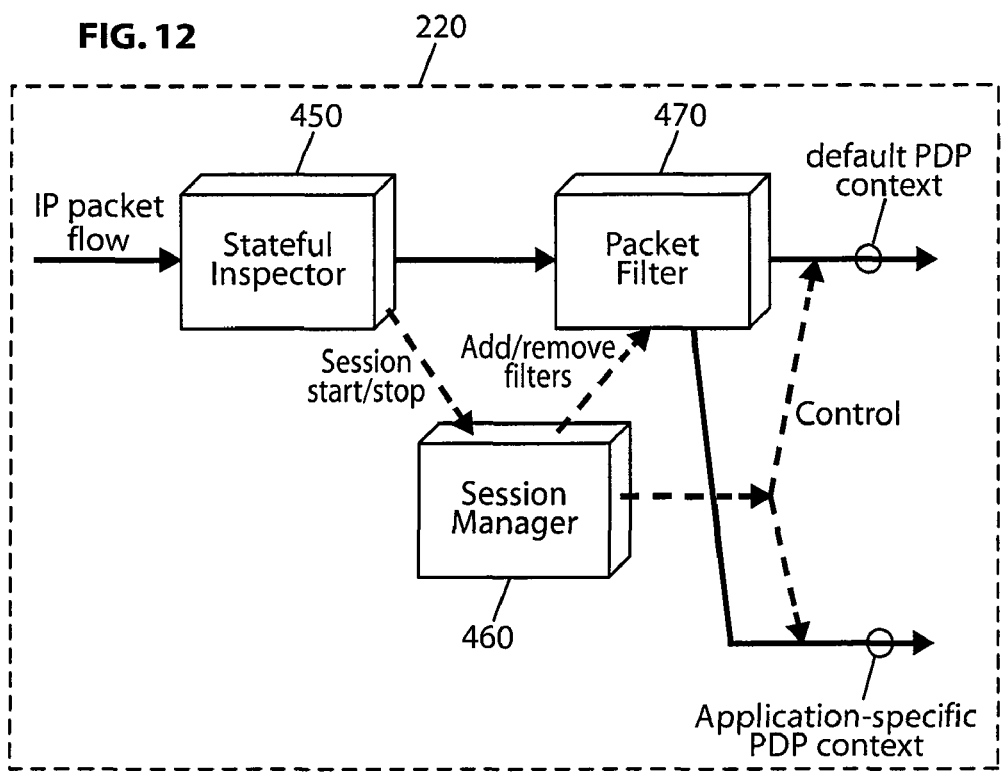
FIG. 12 shows a block schematic diagram illustrating UE packet flow architecture in an uplink direction, in accordance with the invention, in the network of FIG. 11.
Figure 13:
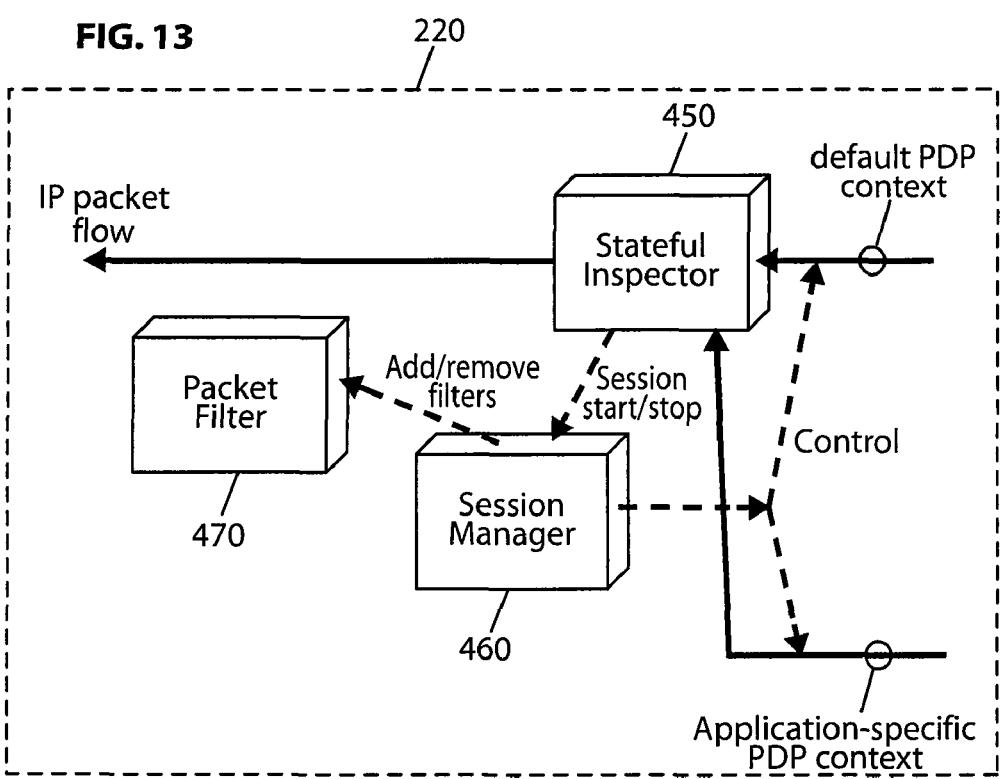
FIG. 13 shows a block schematic diagram illustrating UE packet flow architecture in a downlink direction in accordance with the invention, in the network of FIG. 11.

Referring now to FIG. 12 and FIG. 13, which show uplink and downlink packet flow architectures respectively in the UE (220 or 130):

The stateful inspector 450:

Detects application-specific control messages in the uplink and the downlink.

Implements an interface to the session management entity 460 to control activation/deactivation of application-specific PDP contexts, including sufficient information regarding the IP packet flow for that instance of that application (source/destination IP address, UDP/TCP indicator and source/destination port number).

Implements an interface from session manager 460 to inform it of timed—out sessions.

Session manager 460:

Implements the interface from the stateful inspector 450 to initiate activation/de-activation of secondary PDP contexts.

Controls the activation/de-activation of secondary (application-specific) PDP contexts over the UMTS air interface.

Implements an interface to add/delete with uplink packet-flow filters in the packet filter entity 470 (source/destination IP address, UDP/TCP indicator and source/destination port number).

The packet filter 470:

Implements the interface from session manager 460 to add/remove packet filters and associate them to secondary PDP contexts in the uplink.

It will be appreciated that the method described above for session management in a UMTS radio access network may be carried out in software running on a processor (not shown), and that the software may be provided as a computer program element carried on any suitable data carrier (also not shown) such as a magnetic or optical computer disc.

It will be also be appreciated that the method described above for session management in a UMTS radio access network may alternatively be carried out in hardware, for example in the form of an integrated circuit (not shown) such as an FPGA (Field Programmable Gate Array) or ASIC (Application Specific Integrated Integrated Circuit).

It will be understood that the arrangement and method for session control in a wireless communication network described above provides the advantage of allowing session set-up and tear-down control of dedicated packet sessions for particular data services, in a UMTS 3G mobile wireless network, with application-specific QoS parameters, without the explicit cooperation of the application software (either via software API or modem AT command).

I claim:

1. A wireless apparatus, the wireless apparatus comprising:
circuitry configured to detect application-specific packets, from an application, in a data flow;
and
circuitry configured to provide, in response to the detection of the application-specific packets in the data flow, at least one packet session for wireless communications and activate or deactivate application-specific QoS parameters, without requiring explicit cooperation of the application.

2. The wireless apparatus of claim 1, wherein the at least one packet session comprises packet data protocol (PDP) contexts related to the application specific QoS parameters.

3. The wireless apparatus of claim 1 further comprising wherein the application-specific packets are from an email client application, web browser application, or video client application on a personal computer in communication with the wireless apparatus.

4. The wireless apparatus of claim 1 wherein the application-specific packets are control messages.

5. The wireless apparatus of claim 1 further comprising:
circuitry configured to filter packets to split the application-specific packets in the data flow related to a first packet data protocol (PDP) context and other packets in the data flow related to a second PDP context.

6. A method performed by a wireless apparatus, method comprising:
detecting, by the wireless apparatus, application-specific packets, from an application, in a data flow; and
providing, by the wireless apparatus in response to the detection of the application-specific packets in the data flow, at least one packet session for wireless communications and activating or deactivating application-specific QoS parameters, without requiring explicit cooperation of the application.

7. The method of claim 6, wherein the at least one packet session comprises packet data protocol (PDP) contexts related to the application specific QoS parameters.

8. The method of claim 6 further comprising wherein the application-specific packets are from an email client application, web browser application, or video client application on a personal computer in communication with the wireless apparatus.

9. The method of claim 6 wherein the application-specific packets are control messages.

10. The method of claim 6 further comprising:
filtering packets, by the wireless apparatus, to split the application-specific packets in the data flow related to a first packet data protocol (PDP) context and other packets in the data flow related to a second PDP context.

11. A non-statutory computer-readable storage medium with stored instructions executable by a computer, the instructions comprising:
    instructions to detect, by a wireless apparatus, application-specific packets, from an application, in a data flow; and
    instructions to provide, by the apparatus in response to the detection of the application-specific packets in the data flow, at least one packet session for wireless communications and activate or deactivate application-specific QoS parameters, without requiring explicit cooperation of the application.

12. The non-statutory computer-readable storage medium of claim 11 wherein the at least one packet session comprises packet data protocol (PDP) contexts related to the application specific QoS parameters.

13. The non-statutory computer-readable storage medium of claim 11 further comprising wherein the application-specific packets are from an email client application, web browser application, or video client application on a personal computer in communication with the computer.

14. The non-statutory computer-readable storage medium of claim 11 wherein the application-specific packets are control messages.

15. The non-statutory computer-readable storage medium of claim 11 further comprising instructions to filter packets to split the application-specific packets in the data flow related to a first packet data protocol (PDP) context and other packets in the data flow related to a second PDP context.

\* \* \* \* \*

UNITED STATES PATENT AND TRADEMARK OFFICE
CERTIFICATE OF CORRECTION

PATENT NO. : 8,358,583 B2
APPLICATION NO. : 13/286825
DATED : January 22, 2013
INVENTOR(S) : Andrew Gordon Williams Page 1 of 1

It is certified that error appears in the above-identified patent and that said Letters Patent is hereby corrected as shown below:

IN THE CLAIMS

In claim 11, at column 9, line 1, after "A", delete "non-statutory" and insert therefor --non-transitory--;

In claim 12, at column 9, line 12, after "The", delete "non-statutory" and insert therefor --non-transitory--;

In claim 13, at column 10, line 1, after "The", delete "non-statutory" and insert therefor --non-transitory--;

In claim 14, at column 10, line 6, after "The", delete "non-statutory" and insert therefor --non-transitory--;

In claim 15, at column 10, line 9, after "The", delete "non-statutory" and insert therefor --non-transitory--.

Signed and Sealed this
Eighteenth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.       : 8,358,583 B2                                        Page 1 of 1
APPLICATION NO.  : 13/286825
DATED            : January 22, 2013
INVENTOR(S)      : Williams It is certified that error appears in the above-identified patent and that said Letters Patent is hereby corrected as shown below:

In the Specification

In Column 1, Line 39, delete "1999)" and insert -- 1999). --, therefor.

In Column 1, Line 40, delete "work" and insert -- Work --, therefor.

In Column 3, Line 37, delete "DESCRIPTION" and insert -- DETAILED DESCRIPTION --, therefor.

In Column 8, Line 8, delete "Integrated Integrated" and insert -- Integrated --, therefor.

Signed and Sealed this
Twenty-fifth Day of February, 2014

Michelle K. Lee
*Deputy Director of the United States Patent and Trademark Office*